(12) United States Patent
Bratten

(10) Patent No.: US 6,708,737 B1
(45) Date of Patent: Mar. 23, 2004

(54) VELOCITY FLUME AND METHOD FOR COLLECTING MACHINING COOLANT

(76) Inventor: Jack R. Bratten, 4657 Twin Fawn La., Orchard Lake, MI (US) 48324

( * ) Notice: Subject to any disclaimer, the term of this patent is extended or adjusted under 35 U.S.C. 154(b) by 0 days.

(21) Appl. No.: 10/264,289

(22) Filed: Oct. 2, 2002

(51) Int. Cl.[7] .............................................. B01D 17/12
(52) U.S. Cl. ........................... 141/86; 141/91; 141/98; 141/286; 405/119; 210/154
(58) Field of Search .................. 141/11, 70, 86, 141/89, 91, 98, 286; 405/118–123; 210/154–162, 167, 168

(56) References Cited

U.S. PATENT DOCUMENTS 5,662,812 A * 9/1997 McEwen .................... 210/805
6,017,446 A * 1/2000 Harms et al. ............... 210/168

* cited by examiner

Primary Examiner—Gene Mancene
Assistant Examiner—Peter DeVore
(74) Attorney, Agent, or Firm—John R. Benefiel

(57) ABSTRACT

A low profile velocity flume and method for collecting machine tool coolant along a machine tool installation uses stepped sidewalls to progressively increase the flow space area above a continuously and smoothly sloping bottom wall. Flushing nozzles are located in lateral segments of the sidewall defining the stepped sidewall shape.

10 Claims, 3 Drawing Sheets

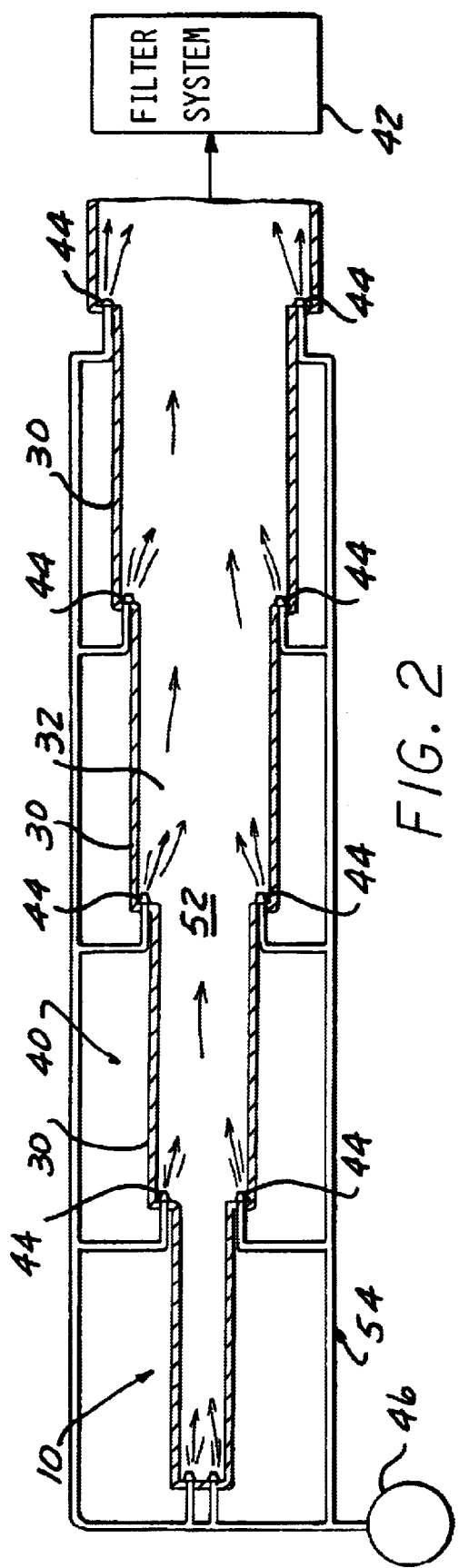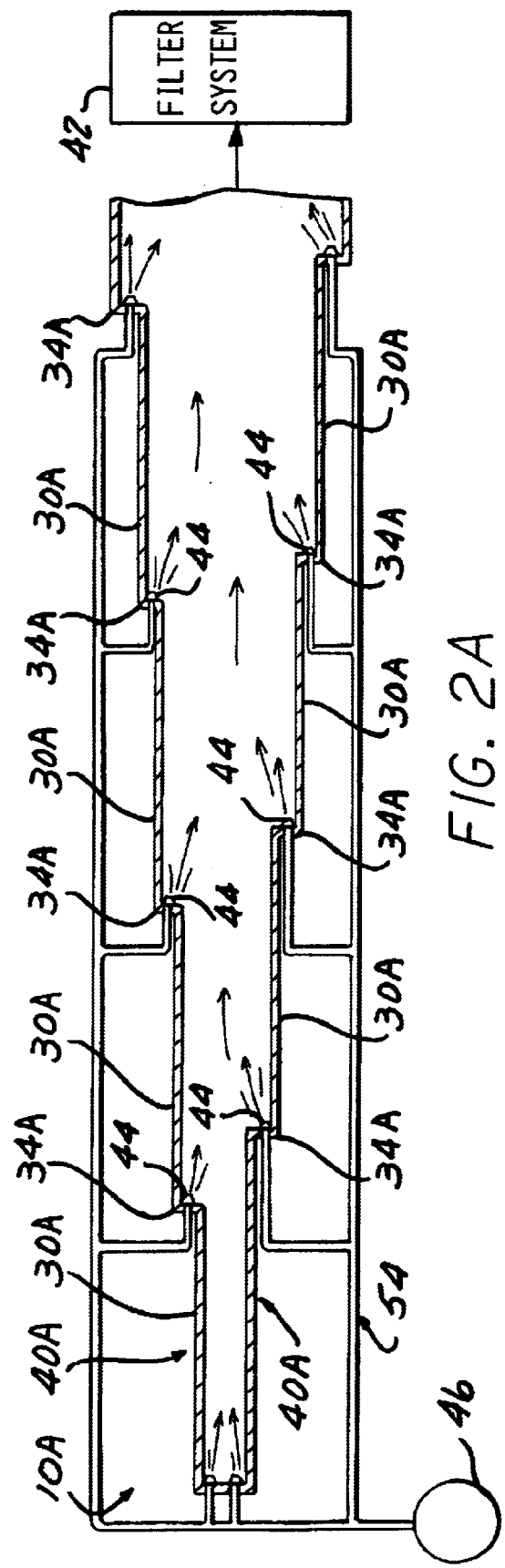

VELOCITY FLUME AND METHOD FOR COLLECTING MACHINING COOLANT

BACKGROUND OF THE INVENTION

This invention concerns coolant collection flumes, typically comprised of below grade trenches or above grade troughs, which extend beneath large installations of machining equipment to collect coolant draining down from the part and tools. Machining chips in the coolant are likewise collected. The coolant and machining chips flow down the flume and are collected for separation of the chips and filtration of the coolant, which filtered coolant is then recirculated to the machining stations.

In order to carry the chips along with the flow of coolant down the flume, certain minimum flow velocities must be maintained in the flume, which varies depending on the size and type of chips.

The coolant flow has often been designed to be gravity induced by downwardly sloping the flume, the velocity determined by the relative inclination of the flume bottom.

Such flumes were traditionally provided by below grade sloping bottom trenches which ran beneath the machine bases. Below grade gravity flow systems are much less costly than systems involving sump pumps and above grade piping systems. There are disadvantages to below grade trenches, such as their cost to construct due to the need for excavating below floor level, the difficulties encountered in making plant layout changes, and in detecting leaks through the trench liner which leaks may create environmental problems.

Above grade gravity flow troughs have thus been developed as described in U.S. Pat. No. 5,980,735 by the present inventor.

Large machine tools such as transfer lines extend for considerable distances, and the available vertical space beneath the machines for the trough is quite limited since the machines are preferably not elevated above the floor so high as to require personnel to climb above floor level, which limited trough height in turn restricts the degree of slope of the trough which can be accommodated.

In order to maintain an adequate flow velocity in relatively shallowly sloped troughs, flush nozzles are arranged in the trough, directing flushing jets of clean coolant down the trough, as described in U.S. Pat. No. 5,980,735.

In this arrangement, coolant drainage is collected from each machining area at various points along the length of the trough, such that increasing volumes of coolant is flowing down the length of the machine.

This increasing flow volume can create a pressure head impeding flow upstream, slowing flow velocities in the trough to the point that chips may begin to accumulate, further restricting flow to possibly create a blockage.

U.S. Pat. No. 5,662,812 describes a trough system involving a main trough and tributary troughs intersecting the main trough. An increased cross sectional area at each intersection is created by a stepped bottom and sidewall.

This arrangement consumes the limited available vertical space by the presence of the stepped bottom and is not suited to low overhead clearance installations, but rather to situations where no severe limitations of the vertical clearance are present.

Flush nozzles are sometimes installed in steps formed in the trough bottom for this purpose, but these steps also use up the available vertical space without efficiently accelerating the flow of coolant.

Another consideration in using flush nozzles is the desirability of efficient use of the flushing jets. The flow from the nozzles is most efficient at transferring energy into the flow stream when covered with liquid coolant and when the jets are aligned with the direction of flow. Since the depth of flow in conventional flumes often varies along its length, the flush nozzles furthest upstream may not be covered as the trough is typically sized to accommodate the maximum flow occurring downstream, and this may result in a too shallow depth in the upstream sections to cover the flush nozzles.

The stepped bottom also tends to create eddies where chips may begin to collect.

Another approach has been to provide a drag conveyor in the trough or trench to move the chips, but its presence substantially impedes liquid flow, necessitating pumps to get sufficient liquid transfer out of the flume, increasing the cost of the system.

It is the object of the present invention to provide a low profile velocity trough configuration for collection and transfer of machining coolant which is particularly suited to situations where very limited vertical space is available for providing a trough slope to gravity induce an adequate coolant flow velocity.

It is a further object to provide such a trough which provides advantageous mounting locations for flush nozzles obtaining efficient use of such flush nozzles.

SUMMARY OF THE INVENTION

The above recited objects and others which will be understood upon a reading of the following specification and claims are achieved by a trough having a continuously sloping bottom which is smooth and uninterrupted to maximize the gravity induced velocity of coolant flowing thereon, but which has sidewalls which are stepped out to wider spacings at points along the length of the trough to create increasing cross sectional areas at downstream locations to increase the flow capacity thereof generally in correspondence to the increased volume of drainage coolant collected. This configuration maintains the flow depth and avoids any pressure head downstream created by in flows downstream which would raise the flow level and impede flow upstream.

Furthermore, adequate depth is maintained in upstream sections to insure good coverage of flush nozzles installed at the stepped portions of the trough sidewalls Also, lateral sidewall segments forming the steps in the sidewalls are advantageous locations for locating the flush nozzles aligned with the direction of coolant flows. Steps in the bottom of the trough for this purpose which would use up limited available vertical space are thus not required.

DESCRIPTION OF THE DRAWINGS

FIG. 2 is a plan view of the velocity trough shown in FIG. 1 with the flow jets and piping.

FIG. 2A is a plan view of an alternate form of the velocity trough according to the invention.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 3:
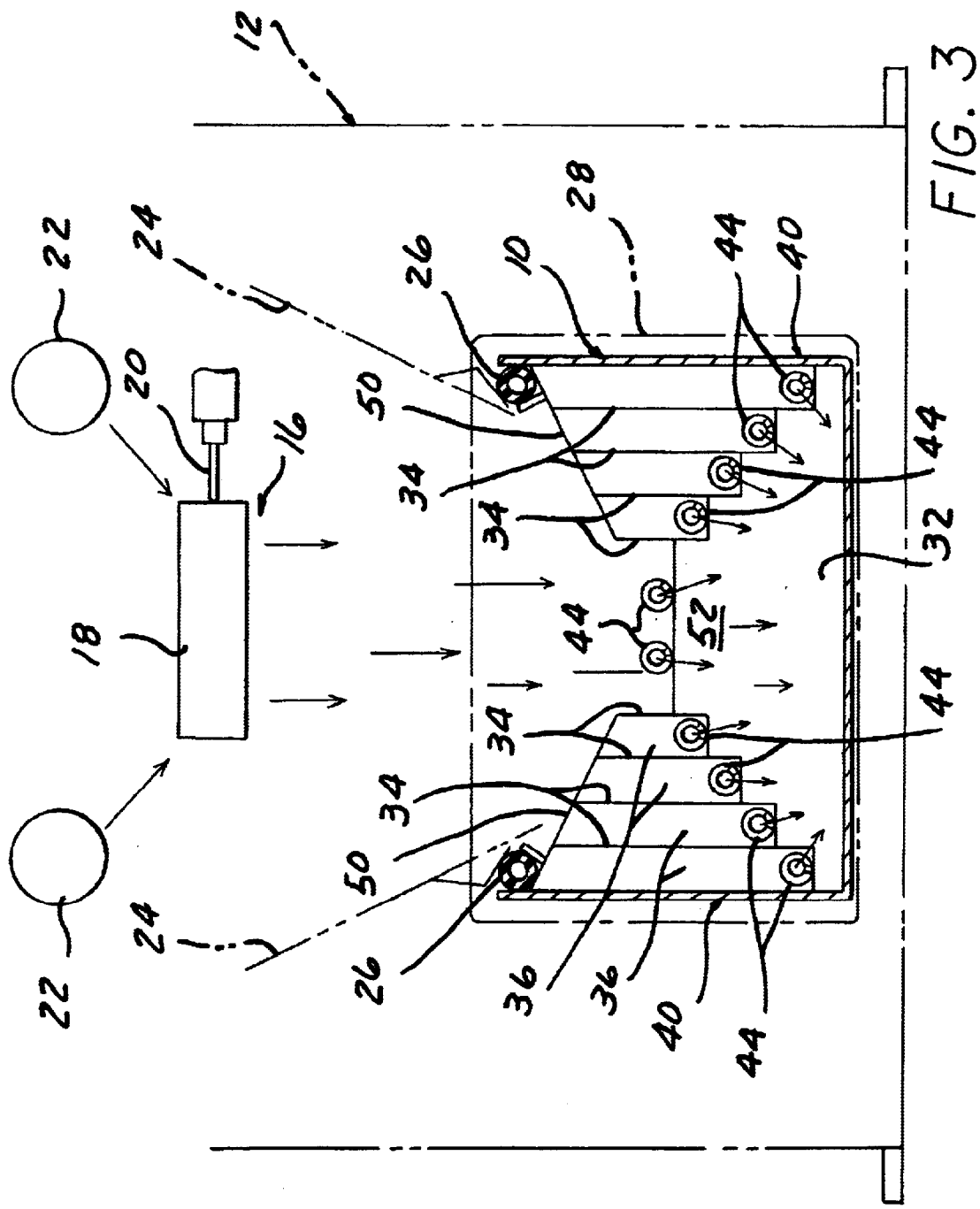
FIG. 3 is a sectional view taken across the velocity trough shown in FIG. 1 together with diagrammatic representations of machine tool components shown in phantom lines.

Referring to the drawings, the figures show a velocity flume taking the form of a trough 10 disposed within and extending along a machine tool installation 12 such as a transfer line 10 resting on a floor 14, a simplified outline thereof represented by phantom lines. A series of machining areas or stations 16 are distributed along the length of the machine tool installation 12 and trough 10 so that coolant draining from the machining areas 16 is collected into the open top of the trough 10. As seen in FIG. 3, a part 18 being machined by a tool 20 is typically flooded with coolant via spray nozzle sources 22, the coolant draining therefrom down into the trough 10.

Machine shed sheets 24 are typically provided to insure that all draining coolant is collected and over splash is avoided. In addition, an inflatable seal 26 is preferably provided along each side establishing a liquid tight joint between a downward sloping cover 50 of the trough 10 and the machine tool 12 as described in detail in U.S. Pat. No. 6,116,616, issued to the present inventor.

The trough 10 extends through a lengthwise "tunnel" 28 formed by aligned openings through the machine tool bases.

The trough 10 is constructed of a flat bottom wall 32 with attached stepped sidewalls 40 defining a liquid receiving space 52.

Figure 1:
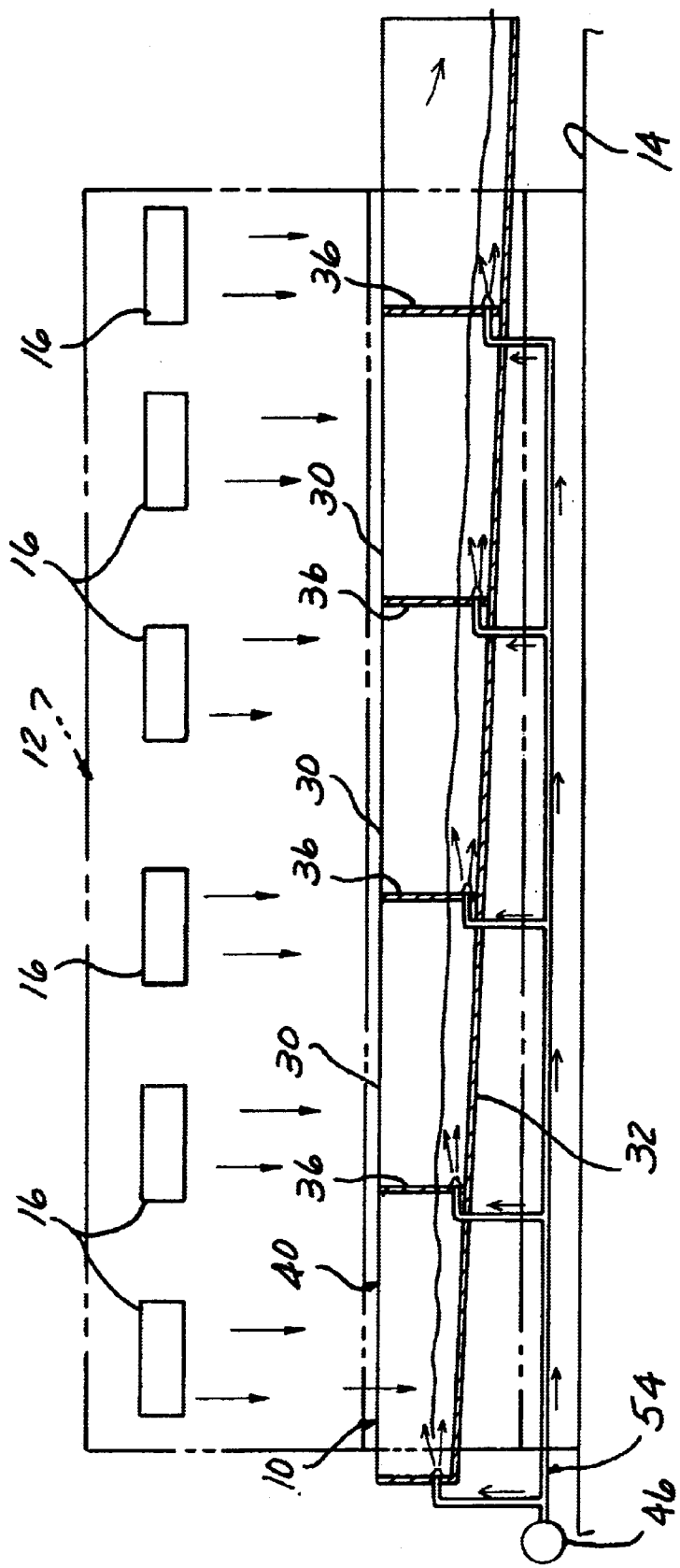
FIG. 1 is a side elevational view of a velocity trough according to the invention with a diagrammatic representation of associated flush jets and piping components and machine tools.

The bottom wall 32 is smoothly and continuously downwardly sloped from a higher entrance end to a lower downstream discharge end (left to right as viewed in FIG. 1), where the flow is directed to a conventional coolant filter system 42. The bottom wall 32 is flat and smooth, preferably continuously sloping without any steps.

Such tunnels 28 usually are quite limited in height, i.e., allowing perhaps 16 or 18 inches drop such that there is only room for slopes of about $\frac{1}{16}$ inches per foot.

The lateral spacing of the sidewalls 40 defining flow receiving space 52 is progressively increased in the downstream direction along the trough length so as to increase the cross sectional area of the trough in approximate correspondence to the downstream increase in flow volume in the trough 10 without stepping the bottom wall 32.

This increased sidewall spacing is achieved by a stepped shape producing a series of vertical outside corners 34 intersecting the bottom wall 32. The corners 34 create narrow width laterally extending sidewall segments 36 (FIG. 3) extending to inside corners 38 made with the longitudinally extending sidewall segments 30.

At the same time, the bottom wall 32 remains continuously sloping downwardly so that all vertical space is available to maximize the degree of gravity induced flow along the velocity trough 10.

The downwardly sloping cover 50 overlying the sidewalls 40 is correspondingly stepped to direct draining coolant into the flow receiving space 52 defined between the inner sidewalls 40.

The laterally extending sidewall segments 36 each provide an advantageous mounting location for flushing nozzles 44 supplied with pressurized clean coolant from a source 46 via a piping system 54, as shown. The flushing nozzles 44 are located adjacent the bottom wall 32 to direct a flushing jet substantially aligned with the direction of gravity flow in the space 52 and to remain submerged as much as possible to maximize their effectiveness.

The laterally extending walls 36 can be aligned as shown in FIG. 2 or staggered as shown in FIG. 2A. This latter arrangement has the advantage of distributing the sources of flushing jet flows more evenly along the length of the trough 10 to better maintain a uniform coolant flow velocity.

I claim:

1. A velocity flume for collecting drainage from overhead machining areas and inducing gravity flow therein having a smoothly sloping flat bottom wall and a stepped width sidewalls extending up from said bottom wall, said sidewalls increasing in spacing from a higher end to a lower end of said flume and together with said bottom wall defining a gravity flow space; and flushing nozzles mounted to said laterally extending sidewall segments and a source of pressurized coolant connected thereto to create flushing jet flows directed down said flume.

2. The velocity flume according to claim 1 wherein said stepped sidewalls are formed with narrow width laterally extending sidewall segments connected to longitudinally extending sidewall segments.

3. A The velocity flume according to claim 1 wherein said flushing nozzles are mounted adjacent said bottom wall.

4. The velocity flume according to claim 1 wherein said laterally extending sidewall segments of each sidewall are aligned with each other.

5. The velocity flume according to claim 1 wherein said laterally extending sidewall segments are each offset from each other to locate said flushing nozzles at staggered locations down the length of said flume.

6. The velocity flume according to claim 1 wherein said flume comprises an above grade trough.

7. A method of collecting coolant draining from a series of machining areas along a machine tool installation within a low above grade clearance space extending through said machine tool installation, comprising the step of installing a velocity trough to extend within said clearance space having an opening in the top disposed to receive coolant draining from said machining areas;

forming said velocity trough with a flat downwardly sloping bottom wall and sidewalls of progressively increasing lateral spacing to define a gravity flow space therein of increasing cross sectional area approximately corresponding to increased coolant volume in said trough at points beneath each successive machining area;

forming lateral sidewall segments defining an increase in the sidewall spacing; and, mounting flushing nozzles to said sidewall segments arranged to direct flushing jets of coolant down said trough.

8. The method according to claim 7 further including the step of locating said flushing nozzles adjacent said bottom wall to be submerged in said coolant flow.

9. The method according to claim 7 wherein said lateral sidewall segments are offset to stagger the location of said flushing nozzles down the length of said trough.

10. The method according to claim 7 wherein said bottom wall is formed to be continuously sloping without any steps.

\* \* \* \* \*